US011981503B2

(12) United States Patent
Krüger et al.

(10) Patent No.: US 11,981,503 B2
(45) Date of Patent: May 14, 2024

(54) PORTION CAPSULE FOR PREPARING A BEVERAGE WITH THE AID OF A BEVERAGE PRODUCTION MACHINE, AND USE OF A PORTION CAPSULE

(71) Applicant: K-FEE SYSTEM GMBH, Bergisch Gladbach (DE)

(72) Inventors: Marc Krüger, Bergisch Gladbach (DE); Günter Empl, Bergisch Gladbach (DE)

(73) Assignee: K-FEE SYSTEM GMBH, Bergisch Gladbach (DE)

( * ) Notice: Subject to any disclaimer, the term of this patent is extended or adjusted under 35 U.S.C. 154(b) by 0 days.

(21) Appl. No.: 17/724,750

(22) Filed: Apr. 20, 2022

(65) Prior Publication Data
US 2023/0047623 A1 Feb. 16, 2023

Related U.S. Application Data

(60) Provisional application No. 63/227,708, filed on Jul. 30, 2021.

(30) Foreign Application Priority Data

Aug. 12, 2021 (DE) .......................... 102021208859.7
Aug. 16, 2021 (DE) .......................... 102021208958.5
Dec. 16, 2021 (DE) .......................... 102021214547.7

(51) Int. Cl.
*B65D 85/804* (2006.01)
*A47J 31/40* (2006.01)
(Continued)

(52) U.S. Cl.
CPC ........ *B65D 85/8058* (2020.05); *A47J 31/407* (2013.01); *A47J 31/4492* (2013.01); *A47J 31/468* (2018.08); *A47J 31/52* (2013.01)

(58) Field of Classification Search
CPC ........ B65D 85/804–8067; A47J 31/468; A47J 31/407; A47J 31/4492
See application file for complete search history.

(56) References Cited

U.S. PATENT DOCUMENTS

D734,665 S    7/2015   Cahen et al.
10,800,600 B2  10/2020  Jarisch et al.
(Continued)

FOREIGN PATENT DOCUMENTS

EP        3023362 B1    5/2016
WO   2005/079638 A1    9/2005
(Continued)

*Primary Examiner* — Drew E Becker
*Assistant Examiner* — Chaim A Smith
(74) *Attorney, Agent, or Firm* — The Dobrusin Law Firm P.C.

(57) ABSTRACT

A portion capsule for the preparation of a beverage with the aid of a beverage production machine, the portion capsule having a base element with a cavity for receiving a beverage raw material and having a capsule lid which closes the cavity, the base element includes a capsule bottom, a circumferential flange, and a capsule wall which extends from the capsule bottom to the circumferential flange, the capsule lid being fastened to the flange, the portion capsule having a feature which can be visually detected, in particular, by a detector of the beverage production machine.

21 Claims, 2 Drawing Sheets

(51) Int. Cl.
 *A47J 31/44* (2006.01)
 *A47J 31/46* (2006.01)
 *A47J 31/52* (2006.01)

(56) References Cited

U.S. PATENT DOCUMENTS

| | | |
|---|---|---|
| 2002/0048621 A1 | 4/2002 | Boyd et al. |
| 2004/0089158 A1 | 5/2004 | Mahlich |
| 2008/0081089 A1* | 4/2008 | Blanc ................ B65D 85/8046 426/77 |
| 2010/0078480 A1 | 4/2010 | Aker |
| 2010/0239734 A1 | 9/2010 | Yoakim et al. |
| 2013/0064929 A1 | 3/2013 | Jarisch et al. |
| 2013/0064937 A1 | 3/2013 | Jarisch et al. |

FOREIGN PATENT DOCUMENTS

| | | |
|---|---|---|
| WO | 2012/010317 A1 | 1/2012 |
| WO | 2016/186488 A1 | 11/2016 |
| WO | 2020/201487 A1 | 10/2020 |
| WO | 2023/285370 A1 | 1/2023 |
| WO | 2023/285374 A1 | 1/2023 |
| WO | 2023/285378 A1 | 1/2023 |
| WO | 2023/285548 A1 | 1/2023 |

* cited by examiner

PORTION CAPSULE FOR PREPARING A BEVERAGE WITH THE AID OF A BEVERAGE PRODUCTION MACHINE, AND USE OF A PORTION CAPSULE

PRIORITY

This application claims priority to German application number 102021214547.7 filed on Dec. 16, 2021, the entirety of which is hereby incorporated by reference herein for all purposes.

FIELD

The present invention proceeds from a portion capsule for the preparation of a beverage with the aid of a beverage production machine, the portion capsule having a base element with a cavity for receiving a beverage raw material and having a capsule lid which closes the cavity, the base element comprising a capsule bottom, a circumferential flange, and a capsule wall which extends from the capsule bottom to the circumferential flange, the capsule lid being fastened to the flange, the portion capsule having a feature which can be visually detected, in particular, by a detector of the beverage production machine.

BACKGROUND

Portion capsules of this type are known from the prior art. For example, document WO 2016/186 488 A1 discloses such a portion capsule of the generic type. This portion capsule is provided to be inserted into a brewing chamber, in which the portion capsule is perforated, in order to introduce brewing liquid in the form of hot water under pressure into the cavity. A beverage is produced by way of interaction between the introduced water and the beverage raw material, in particular roasted and ground coffee, which beverage leaves the portion capsule through further perforation points and passes into a vessel.

An appropriate beverage production machine as a rule exists for each portion capsule, which beverage production machine is optimized for the preparation of beverages on the basis of the appropriate portion capsules. In order to avoid malfunctions, it has proved effective for portion capsules of this type to be provided with detectable features which can be read by machine and visually, in order that a check can be made before the beginning of the brewing process as to whether the inserted portion capsule is compatible with the machine. In addition, an appropriate brewing program for the beverage raw material which is situated in the portion capsule can possibly be started.

Documents EP 3 023 362 B1, WO 2020/201 487 A1 and U.S. Pat. No. 10,800,600 B2 have disclosed visually detectable features of this type to be printed in the form of barcodes or binary codes onto the flange of the capsule.

SUMMARY

It is an object of the present invention to provide a portion capsule with a visually detectable feature (also only called a feature in the following text) of the type mentioned at the outset, which portion capsule represents an improvement with respect to the solutions which are known from the cited prior art. In particular, the detectable feature is to be applied more easily to the portion capsule during the production of the portion capsule. In addition, it is desirable that the feature can be read not only by a detector which is directed onto the lid film, with the result that there are more possibilities for the design of the beverage production machine.

Any feature or element disclosed herein may be duplicated. Any feature or element disclosed herein may be combined with any other feature or element described herein. Any feature or element disclosed herein may be removed and not part of the portion capsule, the beverage machine, and/or the system. Any patent or patent application disclosed herein is incorporated by reference for all purposes.

The object of the present invention is achieved by way of a portion capsule according to claim 1.

Advantageous refinements and developments of the invention can be gathered from the subclaims, and the following description with reference to the drawings.

A portion capsule for the preparation of a beverage with the aid of a beverage production machine is disclosed, the portion capsule having a base element with a cavity for receiving a beverage raw material and having a capsule lid which closes the cavity, the base element comprising a capsule bottom, a circumferential flange, and a capsule wall which extends from the capsule bottom to the circumferential flange, the capsule lid being fastened to the flange, the portion capsule having a feature which can be visually detected, in particular, by a detector of the beverage production machine, the visually detectable feature being arranged on a side of the capsule lid, which side faces away from the flange, and the flange and the capsule lid being of at least partially visually transparent configuration.

The visually detectable feature can therefore advantageously be arranged on a side of the lid film, which side faces away from the base element and, for example, can be printed particularly simply. At the same time, however, reading out of the visually detectable feature is possible from the opposite side of the capsule, that is to say through the flange and the lid film, since the flange and the capsule lid are of visually transparent configuration at least in the region of the visually detectable feature. For example, therefore, the visually detectable material, if it is backlit, for example, from the side of the lid film, is read out by a detector which is arranged on the side of the base element. In the context of the present invention, the wording "visually transparent" means, in particular, that the material is of at least sufficiently light-permeable (also called translucent or partially transparent) configuration that visual reading of the feature by way of a detector is made possible. Therefore, in particular, there does not have to be 100% transparency for all wavelengths of the visual spectrum.

Only an edge region of the capsule lid or the entire capsule lid is preferably of visually transparent configuration. It is conceivable that a central region of the capsule lid which does not cover the flange can be printed in a known way in a visually pleasing manner with a logo or a label or the like, whereas only that region of the capsule lid, in which the feature is arranged and which covers the flange, is of visually transparent configuration. As an alternative, the entire capsule lid is of transparent configuration.

An adhesive layer is preferably arranged between the edge region of the capsule lid and the flange, by way of which adhesive layer the edge region and the flange are connected to one another in an integrally joined manner, the adhesive layer being of visually transparent configuration. Therefore, the feature can advantageously be read visually by the detector through the flange, the adhesive layer and the lid film.

The visually detectable feature is preferably arranged in an edge region of the capsule lid in relation to a main plane of extent of the capsule lid. This means that, in particular as viewed in the radial direction, the feature is arranged in an outer edge region of the preferably round capsule lid.

It is preferably provided that the portion capsule has a ring, the visually detectable feature being arranged, in particular printed, on the ring, the ring being arranged on the capsule lid and, in particular, being adhesively bonded onto the capsule lid.

It is preferably provided that the base element is of completely visually transparent configuration.

It is preferably provided that the base element is constructed in two parts from a base part and a flange part, only the flange part being of visually transparent configuration, the base part and the flange being connected to one another.

It is preferably provided that the visually detectable feature is a machine-readable code, preferably a one-dimensional or multiple-dimensional bit code or barcode.

A further subject matter of the present invention is the use of the abovementioned portion capsules according to the invention for the preparation of a beverage with the aid of a beverage production machine.

In accordance with one preferred embodiment of the present invention, it is provided that the base element is manufactured from plastic. The base element is preferably produced by way of cold working or hot working, in particular deep-drawing. The configuration of the base element with a cavity is preferably produced by way of thermoforming, for example deep-drawing by means of negative pressure, positive pressure and/or a movable die. As an alternative, the portion capsule is produced by means of injection moulding methods, in particular in the single-component, multiple-component or in-mould method.

The base element is preferably configured from polyethylene (PE), polypropylene (PP), polyvinyl chloride (PVC), polymethyl methacrylate (PMMA), polycarbonate (PC), polystyrene (PS), poly(p-phenylene oxide) (PPO) or polyethylene terephthalate (PET).

The cover lid is preferably configured from polyethylene (PE), polypropylene (PP), polyvinyl chloride (PVC), polymethyl methacrylate (PMMA), polycarbonate (PC), polystyrene (PS), poly(p-phenylene oxide) (PPO) or polyethylene terephthalate (PET).

It is conceivable that the cover lid and the base element consist of the same material.

The base element is preferably of frustoconical, conical, cylindrical, spherical, hemispherical, elliptical or partially elliptical configuration. The base element is preferably of rigid or semi-rigid configuration. The cavity which is formed by way of the base element serves to receive beverage raw material, for example roasted coffee granules, instant coffee, chocolate powder, blended tea, milk powder and/or the like. The lid film is, in particular, of planar or almost planar configuration, at least immediately after closure of the filled portion capsule by way of the lid film. Any crowned portions of the lid film during the course of time as a result of outgassing of coffee powder do not lead to the lid film not being planar in the sense of the present invention, since said crowned portion typically occurs only some time after filling of the portion capsule.

The lid film preferably comprises a plastic/aluminium composite film or a plastic film or a multiple-layer plastic film. It is conceivable that the portion capsule is of rotationally symmetrical configuration about its longitudinal axis. The longitudinal axis therefore forms a central axis of rotational symmetry which runs centrally through the portion capsule and in the process, in particular, substantially perpendicularly with respect to a main extent plane of the lid film. The flange of the base element preferably runs at an angle between 70 and 110 degrees, preferably of from 80 to 100 degrees, and very particularly preferably of substantially 90 degrees with respect to the axis of rotational symmetry. The flange is, in particular, of closed, circumferential configuration. The free, outer end of the flange preferably has a bead, a flanged portion or what is known as a rolled edge, in order to avoid injuries of the user at the sharp-edged end.

The portion capsule can contain one or more beverage substances. The one or more beverage substances can be a liquid, a syrup, a solid, a powder, coffee grounds or ground cocoa, tea leaves or a combination thereof. The one or more beverage substances can be diluted or extracted in a beverage production machine and/or a beverage system, in order to produce a beverage.

The portion capsule can comprise each of the visually detectable features and/or elements which are described and/or depicted here. Each of the features and/or elements which are described herein can be combined to produce a portion capsule. Each of the features and/or elements described herein can be duplicated, in order to produce a portion capsule. Each of the features and special elements described herein can be eliminated or omitted, in order to produce a portion capsule. Each of the features disclosed herein can be rearranged on each of the elements or surfaces stated herein. For example, a feature or element which is specified as being situated on the flange of the portion capsule can also or instead be arranged on the lid or the base element.

The portion capsule can have a body or a base element. The body or the base element can be a vessel or can form one or more cavities, in which the beverage substance and/or one or more elements are/is received and/or stored. The body of the base element can have a side wall with rounded, curved or hemispherical surfaces. The body of the base element can have a side wall with rectilinear, planar or tapering surfaces. The body of the base element can have a side wall with surfaces which form a hemisphere, a dome, a cone or a truncated cone. The base element can have a bottom face. The bottom face can be rounded or can have a hemispherical shape. The bottom face can generally be flat or planar. The bottom face can have one or more indentations. If the bottom has more than one depression, the two or more depressions can be concentric or can lie inside one another. The bottom face can be angled away or inclined with respect to the side wall.

The portion capsule can have a flange. The flange and the base element can consist of one or more integral materials. The flange and the base element can be formed from one or more separate materials, and can then be connected to one another by way of a joining process. For example, the flange and the base element can be connected by way of an adhesive, a seal or another suitable connecting method. The flange can consist of the same material as the base element and/or the lid. The flange can consist of a different material to the base element and/or the lid. The flange can have an annular shape which extends at least partially around the entire circumference of the base element. In certain embodiments, however, the flange can also extend only over a part of the circumference of the base element. In some cases, the flange can consist of two or more tabs which extend from the base element. The flange can project or extend the outside from the base element or the side wall of the base element. The flange can extend from the base element at an angle, with the result that an angle between the upper face of the flange and the sidewall of the capsule is an acute angle (less than 90 degrees). The flange can extend at an angle from the base element, with the result that an angle between the upper side of the flange and the side wall of the capsule is an object angle (less than 90 degrees). The flange can extend from the base element at an angle, with the result that an angle between the upper side of the flange and the side wall of the capsule is approximately a right angle (approximately 90 degrees).

The flange can be situated on the upper side of the base element. The flange can be situated on the lower side of the base element. The flange can be situated in a region between the lower surface and the lower surface of the base element. The flange can be situated closer to the upper side than to the lower side of the base element, or vice versa.

The portion capsule can be provided with a lid (also called a capsule lid). The lid can close or seal the cavity of the base element, after the beverage ingredient has been added or introduced into the cavity. The lid can produce an airtight or hermetic seal, in order to maintain the freshness of the beverage ingredient. The lid can bring about a non-airtight or non-hermetic seal. The lid can produce a seal, with the result that air and moisture are prevented from penetrating into and/or leaving from the cavity or the capsule. The lid can be fastened to the portion capsule, to the base element, to the upper side of the base element, to the lower side of the base element, to the flange, to the upper side of the flange, to the lower side of the flange or to a combination thereof. The lid can be attached by way of adhesive bonding, welding or another suitable fastening method or fastening apparatus. The lid can consist of the same material as the base element and/or the flange. The lid can be produced from a different material from the base element and/or the flange. The lid, the flange and/or the base element can consist of one or more integral materials.

The lid, the flange and/or the base element can consist of one or more separate materials, and can then be connected to one another by way of a joining process. For example, the lid, the flange and/or the base element can be connected by way of an adhesive, a seal, a welding method or another suitable connecting method.

The portion capsule, the body or the base element, the flange and/or the lid can consist of a material which is suitable for producing a beverage and/or for storing ingredients for the production of beverages. The portion capsule, the base element, the flange and/or the lid can consist of a non-metal. The portion capsule, the base element, the flange and/or the lid can be produced from recycled material. The portion capsule, the base element, the flange and/or the lid can be produced from a recyclable material. The portion capsule, the base element, the flange and/or the lid can be produced from a bio-degradable material. The portion capsule, the base element, the flange and/or the lid can be produced from a paper material. The portion capsule, the base element, the flange and/or the lid can be produced from a compostable material. The portion capsule, the base element, the flange and/or the lid can be produced from a cellulosic material. The portion capsule, the base element, the flange and/or the lid can be produced from a material which comprises polylactic acid. The portion capsule, the base element, the flange and/or the lid can be produced from a material which withstands deformation, dissolving and disintegration at temperatures of up to at least 120° C. or more or less. The portion capsule, the base element, the flange and/or the lid can be produced from material which is obtained from maize. The portion capsule, the base element, the flange and/or the lid can be produced from a plant-based material. The portion capsule, the base element, the flange and/or the lid can be produced from a material which is free from polystyrene. The portion capsule, the base element, the flange and/or the lid can be produced from a material which is food-safe. The portion capsule, the base element, the flange and/or the lid can be produced by way of injection moulding, thermoforming, drawing or the like. The base element, the flange and/or the lid can be laminated. The portion capsule, the base element, the flange and/or the lid can be produced from an electrically conductive material. The portion capsule, the base element, the flange and/or the lid can be produced from an electrically non-conducting material. The portion capsule, the base element, the flange and/or the lid can be produced from a woven fabric material. The portion capsule, the base element, the flange and/or the lid can be produced from a rubber material. The portion capsule, the base element, the flange and/or the lid can be produced from a plastic material. The portion capsule, the base element, the flange and/or the lid can be produced from aluminium. The portion capsule, the base element, the flange and/or the lid can consist of a material which is elastic or deformable. The base element, the flange and/or the lid can consist of a deformable material which can withstand different liquid temperatures (hot and cold) and liquid pressures, without being damaged (that is to say, without the base element, the flange and/or the lid tearing or fracturing in undesired regions). The portion capsule, the base element, the flange and/or the lid can have a generally identical wall thickness. The portion capsule, the base element, the flange and/or the lid can have a different wall thickness. For example, the portion capsule, the base element, the flange and/or the lid can have a thicker wall thickness in certain regions, in order to prevent destruction of the portion capsule during handling and/or use.

The portion capsule can have one or more capsule features. The one or more capsule features can be one or more projections, ridges, elevations and/or convexities which extend away from the outer face of the base element or protrude beyond it. The one or more capsule features can be one or more channels, grooves, depressions, troughs or concavities which extend or project from the outer face into the base element. The one or more capsule features can extend around the entire circumference of the body or the base element. The one or more capsule features can also extend only over a part or a region of the circumference of the body or the base element. The one or more surface capsule features can extend continuously around the body or the base element. The one or more capsule features can extend intermittently (beginning and end) around the body or the base element. The one or more capsule features can be situated only on the base element. The one or more capsule features can be situated only on the lid. The one or more capsule features can be arranged only on the flange. The one or more capsule features may not be situated on the body, the flange, the lid or a combination thereof. The one or more capsule features can be situated on the inner face of the base element. The one or more capsule features can be arranged on the outer face of the base element. The one or more capsule features can be arranged on the upper side of the flange, the lower side of the flange, the side face of the flange or a combination thereof. The one or more capsule features can be one or more rings which extends/extend over the entire circumference or a part of the circumference of the portion capsule. The one or more features of the portion capsule can be diagonal or can extend in a diagonal or an angle relative to a central longitudinal axis of the portion capsule. The one or more capsule features can have irregular shapes, such as flourishes or swirls. The one or more capsule features can be oriented vertically (from the upper side to the lower side of the base element). The one or more capsule features can extend onto the flange (upper side, lower side and/or side face of the flange). The one or more capsule features may not extend onto the flange. The one or more capsule features can extend from the flange as far as the bottom face of the base element. The one or more capsule features can extend from the flange in the direction of the bottom face of the base element, but must not extend as far as the bottom face. The one or more capsule features can extend from the lower surface of the base element to the upper surface of the base element, but must not extend as far as the upper surface. The spacing between adjacent capsule features can be homogeneous. In other words, the spacing between some or all capsule features can be substantially identical. The spacings between adjacent capsule features can be different. In other words, the spacing between some or all capsule features can be different. The one or more capsule features can have a zebra shape or a zebra print. This can mean that the one or more capsule features extend along at least one part (or the entirety) of the body or the base element, the lid and/or the flange. The one or more capsule features can fade or be less visible in certain regions, while they are more intense or more visible in other regions. For example, the visibility of the one or more capsule features can change. For example, the depth of the depression or groove can become shallower or deeper in certain regions of the base element, the lid and/or the flange. For example, the height or the projection of a rib or a ridge can be greater or smaller in certain regions of the base element, the flange and/or the lid than in other regions of the base element, the flange and/or the lid.

The one or more capsule features can be situated only on the outer face of the side wall or the body. The one or more capsule features can be situated only on the inner face of the side wall or the body. The one or more capsule features can be situated both on the inner face and on the outer face of the side wall of the body. The one or more capsule features which is/are situated on the outer face can correspond to the one or more capsule features which is/are situated on the inner face of the capsule body. For example, a groove on the outer face of the capsule body can form a rib or a projection on the inner face of the side wall, or vice versa. For example, a groove on the upper side of the channel or lid can form a rib or a projection on the lower side of the flange or lid, or vice versa.

The one or more capsule features which are situated on an inner face or in the interior of the cavity can serve to change or to interrupt the liquid flow of the beverage into and/or through the base element. The one or more capsule features can serve to bring about or to generate a turbulent liquid flow into and/or through the capsule. The one or more capsule features can serve to cause or to generate a laminar liquid flow into and/or through the capsule. The one or more capsule features can serve to generate a swirl of the liquid into and/or through the capsule. The one or more capsule features can bring it about that the liquid which flows into and through the capsule moves upwards and/or downwards, in order to extract and/or to dissolve the beverage constituent part in the capsule.

The portion capsule can be coated with an ink, with a material which imparts a metallic appearance to the portion capsule, which metallic appearance can be produced from an ink or metallic flakes or metallic particles or pigments. The particles can be suspended or dispersed in an aqueous medium, and can then be applied to the base element, the lid and/or the flange. It is possible that the particles or pigments are incorporated into the plastic when the plastic is in a melted or softened state, in order to provide the metallic appearance. For example, an aluminium flake material can be added to the plastic in order to impart a unique appearance to the latter and/or in order to conceal manufacturing whirls or defects which as a consequence of The one or more capsule features can be configured integrally on the capsule body or the base, the lid and/or the flange. The one or more capsule features can be added to the capsule body or the base, the lid and/or the flange. The one or more capsule features can be printed onto or applied to the capsule body or the base, the lid and/or the flange. The one or more capsule features can be formed or produced from the same material as the capsule body, the flange and/or the lid. The one or more capsule features can be formed or produced from a different material to the capsule body, the flange and/or the lid. The one or more capsule features can be printed, embossed, etched, adhesively bonded or attached onto the capsule body, the flange and/or the lid.

The one or more capsule features can be adhesively bonded, welded or fastened to the capsule base in another way.

The one or more capsule features can also be the one or more visually detectable features. In this regard, the one or more capsule features can serve one or more purposes or functions disclosed herein. As an alternative, the one or more capsule features can fulfil only the function or the purpose of a visually detectable material.

The portion capsule can have one or more visually detectable features. The one or more visually detectable features can be situated on the portion capsule, the body or base element, the side wall, the outer face of the side wall, the inner face of the side wall, the flange, the upper side of the flange, the lower side of the flange, the side face of the flange, the lid, the upper side of the lid, the lower side of the lid, the side face of the lid or a combination thereof.

The one or more visually detectable features can be detected, recognized and/or identified by one or more detectors of the beverage machine and/or the system. The one or more detectors can be one or more lasers, lights, light curtains, scanners, readers, eyes, cameras, barcode readers, bit code readers or a combination thereof. After the portion capsule has been introduced into the beverage machine, the one or more detectors can be arranged above the portion capsule, below the portion capsule, next to the portion capsule or a combination thereof. The one or more detectors can comprise, or be connected electronically to, one or more processors, memories, programs, hard drives, RAM or other computer hardware and computer software. The one or more detectors can function in such a way that they read and/or identify the one or more visually detectable features and/or correlate it/them with one or more stored references. One or more read visually detectable features can be stored on a hard drive, in a memory or in a cloud of the detector, the beverage machine or in both. The one or more detectors can function in such a way that they read and/or identify the one or more visually detectable features and/or correlate it/them with one or more stored references, in order to determine the type of portion capsule. For example, the one or more detectors can detect whether the portion capsule contains coffee, espresso, cocoa, alcoholic or alcohol-free beverage ingredients or ingredients for machine cleaning. For example, the one or more detectors can detect whether the portion capsule requires warm, cold or ambient water or another liquid (milk, juice, etc.), in order to produce the desired beverage. For example, the detector or detectors can determine the machine parameters for producing the desired or intended beverage, such as, for example, the liquid temperature, the liquid pressure, the liquid quantity, the heating or cooling time and/or heating or cooling temperature, whether additional ingredients or liquids have to be mixed with the beverage, or whether they have to run through the portion capsule. The one or more detectors can be capable of identifying the machine parameters for cleaning the beverage machine if the detector detects that the capsule is intended for cleaning the machine. The one or more detectors can function in such a way that they detect an incompatible visually detectable feature if a portion capsule is introduced into the machine, which portion capsule is not provided for use in the machine. This can advantageously prevent a fault from occurring, the machine from being damaged and/or an operator or bystander being injured.

The beverage machine may include one or more pumps, sensor/detectors, controllers, memories, stored references. The controller may be programmed and/or reprogrammed. This allows the beverage machine to be programmed with new brewing parameters after the machine is sold by the manufacturer or distributor and bought by a customer. This may allow the machine to be used for new beverage products that may not have been available when the beverage machine was first sold/purchased.

The beverage production machine may comprise one or more pumps. The pump may be put into operation only upon a detection of the detectable feature and a determination by a controller or processor of the sensor detector or beverage production machine that the portion capsule is suitable for the beverage production machine. The determination may occur via one or more processors on the machine and/or cloud. The determination may occur by comparing the detected feature with a stored reference. The determination may occur via one or more programs, look-up tables, algorithms. In some configurations, the pump may be turned on before the detectable feature is read and/or the determination is made. In such a configuration, the pump may be turned on to pre-wet the beverage material but restricted or prevented from supplying the full amount of water and/or hot water under pressure.

The one or more visually detectable features can be one or more of the following: colours, patterns, logos, barcodes (two-dimensional and/or three-dimensional), bit codes, binary code, depressions, notches, elevations, projections, elevations, water marks, magnet regions, electrically conductive regions, non-electrically conductive regions. The one or more visually detectable features can be visible to the human eye. The one or more visually detectable features can be invisible to the human eye. The one or more visually detectable features can comprise ribs, projections, elevations, bumps, spacers, abutments, openings, holes, depressions, grooves and depressions. The one or more visually detectable features can be one or more images, patterns, lines or grooves. The one or more visually detectable features can be flat or one-dimensional. The one or more visually detectable features can be three-dimensional.

The beverage machine can comprise one or more detectors. The one or more detectors can be connected electrically (in a wired or wireless manner) to a system network. The one or more detectors can transmit information about the use of the portion capsule in the machine to the system network. The information can be collected from one or more visually detectable features and/or the machine and can then be transmitted to a system network. The collected and transmitted information can aid a supplier or producer of the portion capsules and/or machines or a service technician to detect problems with the portion capsule and/or the machine. The collected and transmitted information can aid a supplier or producer of the portion capsules and/or machines to predict the habits of the consumers, to determine the consumption, to produce orders, to manage the stock level, to produce a customer loyalty programme, to collect information about the preferences of the consumers, to generate and to analyse data, and to predict the production, manufacturing and dispatch on the basis of the consumption of the consumers. The system network can be situated anywhere in the world, including in the same state or country as the beverage machine and/or the user, or in another state or country. The one or more detectors may produce a beam, laser, or scan for the detectable feature. The beam, laser, or scanner may be adapted to sufficiently penetrate the capsule wall, flange, and/or lid, to read the detectable feature. The beam, laser, or scanner may be adapted to sufficiently penetrate one or more walls of the capsule receptacle into which the portion capsule is loaded before making the beverage.

The present teaching provides a method for recycling and/or composting a portion capsule, the lid, the filter or a combination thereof. The method can comprise the separation of one or more elements (if present) from the portion capsule, the separation of the lid from the portion capsule, and the composting of one or more of the base elements and/or the lid. The method can comprise a step of composting of the entire portion capsule including the lid, the filter (if present) and/or the bottom.

Further details, features and advantages of the portion capsule result from the drawings, and from the following description of preferred embodiments on the basis of the drawings. Here, the drawings illustrate merely exemplary embodiments of the portion capsule which do not restrict the essential concept of the invention.

DETAILED DESCRIPTION

Figure 1A:
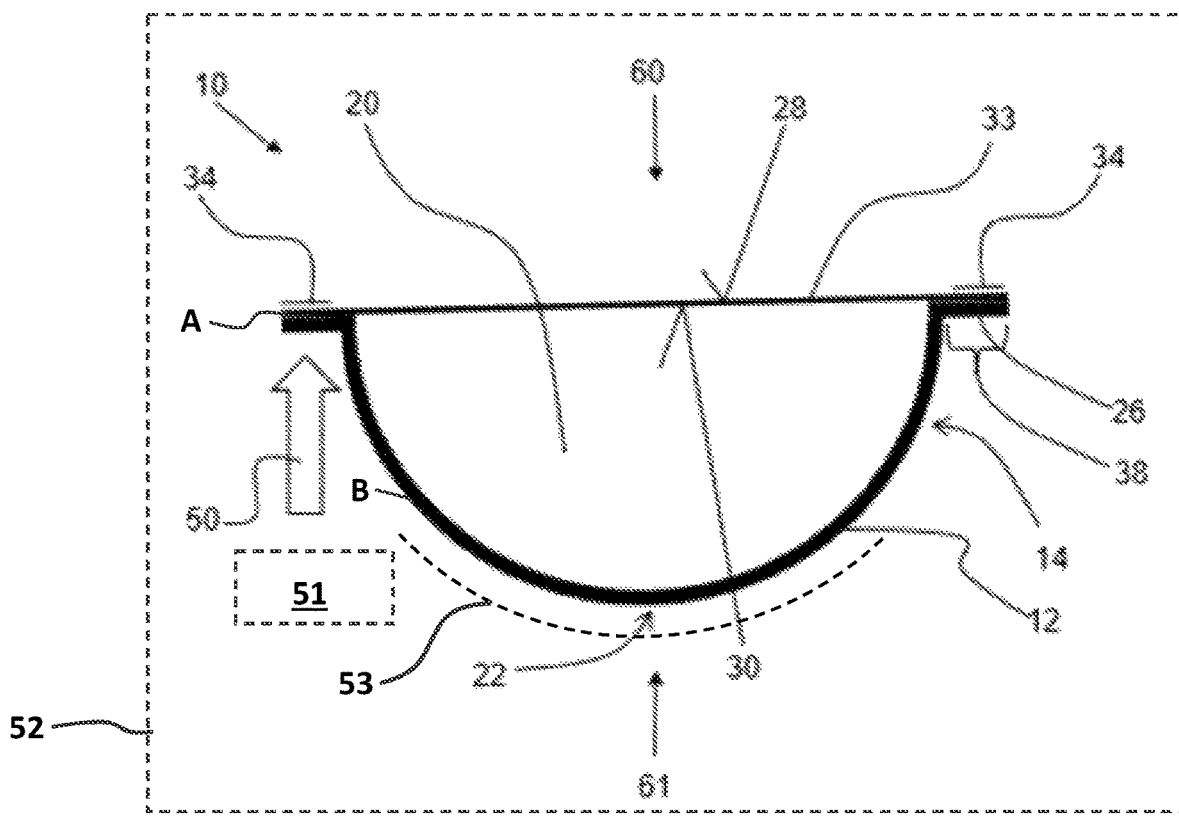
FIG. 1A shows a diagrammatic sectional view of a portion capsule in accordance with one exemplary embodiment of the present invention.

FIG. 1A discloses a diagrammatic side view of a portion capsule 10 for preparing a beverage.

The portion capsule 10 has a base element 12 (also called a body). The body of the base element 12 comprises a side wall 14 (also called a capsule wall). The side wall 12 extends from the bottom region 22 (also called a capsule bottom) as far as a circumferential flange 26 which projects laterally and, in particular, is of circumferential configuration. The base element 12 defines a cavity 20 which is provided for receiving beverage raw material. On the side which faces away from the bottom region 22, the base element has a filling opening, through which the cavity 20 can be filled with the beverage raw material.

The portion capsule 10 has by way of example a base element 12 of spherical configuration which has the capsule bottom 22 (which can be of curved configuration and in no way has to be of planar configuration) on its closed side and has a circumferential flange 26 on its open side. The capsule wall 14 extends around the cavity 20 between the capsule bottom 22 and the flange 26. The portion capsule 10 is of rotationally symmetrical construction about its central centre longitudinal axis. The flange 26 which is configured to be circular and therefore circumferential in the circumferential direction projects outwards beyond the capsule wall 14 in the radial direction with respect to the central axis of rotational symmetry. The base element 12 and the flange 26 may be made from the same material and be integrally formed. Alternatively, the flange 26 and the base element 12 may be two parts A, B that are subsequently joined together.

The flange 26 is connected fixedly to a capsule lid 33 (also called a lid or membrane) in the form of a lid film which is, in particular, circular and closes the cavity 20 on the open side of the base element 12. For this purpose, the flange 26 preferably has a sealing plane which faces the capsule lid 33 and extends approximately at a right angle with respect to the axis of rotational symmetry. The capsule lid 33 is sealed, welded or adhesively bonded in its edge region to the flange 26 and, in particular, onto the sealing plane.

The cavity 20 is configured within the base element 12, which cavity 20 is filled with the beverage raw material, for example roasted coffee granules, instant coffee, chocolate powder, blended tea, milk powder and/or the like (not illustrated for reasons of clarity), and which cavity 20 is closed by way of the capsule lid 33.

The portion capsule 10 is provided to be introduced into a brewing unit of a beverage production machine, in order to produce a beverage. The brewing unit comprises a first brewing chamber part and a second brewing chamber part, it being possible for the first or the second brewing chamber part to be moved, in particular pivoted or displaced, relative to the other brewing chamber part between an approached position, in which the first and the second brewing chamber part form a closed brewing chamber, and an open position, in which the first and the second brewing chamber part are spaced apart from one another in order to insert or eject the portion capsule 10.

In the closed position, the capsule lid 33 and/or the capsule bottom 22 are/is perforated, in order to produce a perforation opening for the introduction of brewing liquid (e.g., hot water) or for the discharge of the produced beverage. The lid and/or bottom may be pierced or perforated via a piercing means of the beverage machine such as one or more mandrels, spikes, protuberances, teeth, etc. The beverage machine may have a sealing means to seal against the lid to prevent the hot water and/or the beverage product from leaking or spilling. The brewing liquid is introduced under pressure into the cavity 20. The desired beverage is produced by way of the interaction between the brewing liquid and the beverage raw material, which desired beverage leaves the portion capsule 12 through the perforation openings and is fed to a beverage vessel. Any particles of the beverage raw material can be filtered from the beverage and retained in the portion capsule 10 by way of an optional filter medium. In other words, in some configurations, the portion capsule may include a filter element between the beverage raw material and the lid 33 and/or between the beverage raw material and the bottom 22. The multiply perforated capsule lid 33 may acts as filter element, however.

The portion capsule 10 then has a feature 34 which can be visually detected, in particular, by a detector of the beverage production machine. This feature 34 preferably serves to identify the portion capsule 10 in the beverage production machine and/or to control brewing parameters. Therefore, for example, it can be verified by the beverage production machine whether the portion capsule 10 which is situated in the brewing chamber is a system-compatible portion capsule 10, and/or a suitable brewing program for the beverage raw material which is situated in the portion capsule 10 can be selected and started automatically. It is also conceivable that brewing parameters which are specifically to be used are embedded into the visually detectable feature 34 and are read out by means of the detector.

The visually detectable feature 34 is, in particular, a machine-readable code which is applied to the lid film 33 in the form of a one-dimensional or multiple-dimensional bit code or barcode. Here, the bit code or barcode is configured completely or partially circumferentially as a circle or partial circle around the axis of rotational symmetry of the portion capsule 10. The individual adjacent bars, from which the, in particular, two-colour or multiple-colour bit code or barcode is constructed, then preferably extend in the radial direction in relation to the axis of rotational symmetry. Here, the code is applied to an upper side 28 of the lid film 33, which upper side 28 faces the flange 26. Here, in particular, the code is situated in a circumferential edge region 38 of the lid film 33, that part of the lid film 33, in particular, being called the edge region 38 which is fastened to the flange 26 and/or is directly in contact with the flange 26.

Figure 1B:
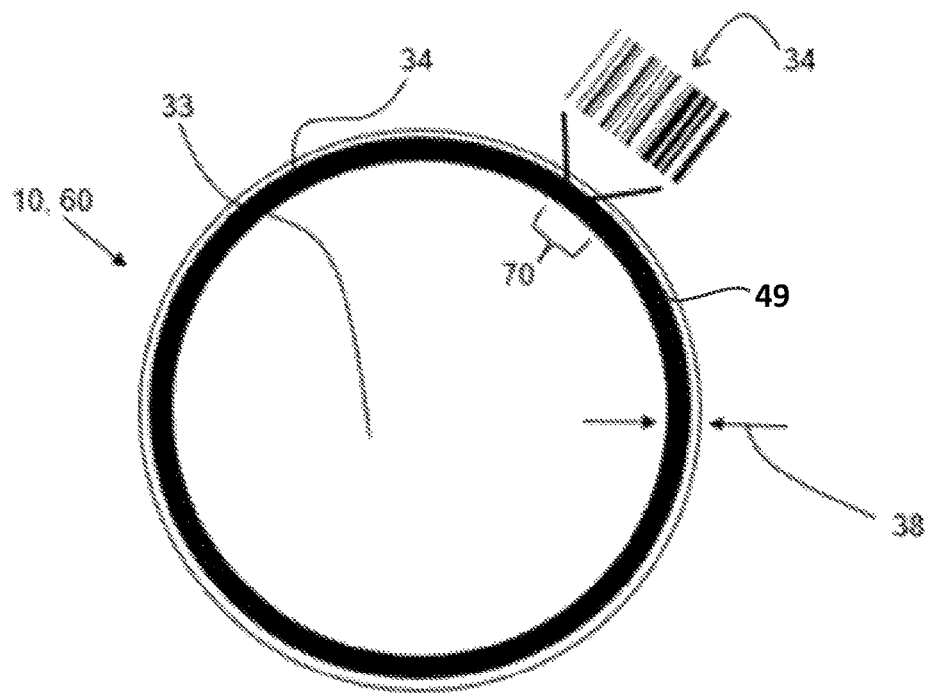
FIG. 1B shows a diagrammatic view "from above" of the portion capsule in accordance with the exemplary embodiment of the present invention.

Here, the code 34 is either printed directly in the edge region onto the upper side 28, or is applied to a ring 49 which is adhesively bonded onto the upper side 28 of the lid film 33 (See FIG. 1B).

In order that the code can be read out by a schematically illustrated detector 51 of the schematically illustrated beverage preparation machine 52, which detector 51 is directed "from below", that is to say along a direction from the base element 12 in the direction of the lid film 33, in particular parallel to the axis of rotational symmetry, onto the flange 26 of the portion capsule 10 (illustrated by way of the arrow 50), the lid film 33 is of transparent or translucent configuration at least in the edge region 38, and the capsule body 12 is of transparent or translucent configuration at least in the region of the flange 26. The wording "visually transparent" means that the materials are of light-permeable (also called translucent or partially transparent) configuration at least to such an extent that the detector can visually read out the code. For this purpose, the code can be backlit in the beverage preparation machine. For example, the beverage production machine may include a light or means that backlights the capsule so that the sensor detector 51 of the beverage machine can visually or optically read the code.

One or more sensor detectors may be located above the capsule lid after the capsule is received into a receptacle of the beverage production machine. One or more sensor detectors 51 may be located below the capsule lid 33 after the capsule is received into a schematically illustrated receptacle 53 of the beverage production machine 52. One or more sensor detectors may be located above the lid and one or more sensor detectors may be located below the lid. Such an arrangement may allow for multiple different portion capsules to be loaded and used in the beverage machine. Additionally, or alternatively, such an arrangement may ensure the detectable feature is read by the machine.

It is conceivable that the entire lid film 33 is of transparent configuration, or only in the edge region, with the result that printing of the lid film with a logo, product designations, labels and the like is possible in a central region which lies in the radial direction within the edge region 38.

Either the entire base element 12 or only the flange 26 of the base element 12 can likewise be of transparent or translucent configuration.

In order to achieve an at least partially visually transparent base element 12 and an at least partially visually transparent lid film 33, the base element 12 and the lid film 33 are preferably manufactured from polyethylene (PE), polypropylene (PP), polyvinyl chloride (PVC), polymethyl methacrylate (PMMA), polycarbonate (PC), polystyrene (PS), poly(p-phenylene oxide) (PPO) or polyethylene terephthalate (PET). The pot-shaped or spherical configuration of the base element 12 is preferably produced by way of thermoforming, for example deep-drawing by means of negative pressure, positive pressure and/or a movable die. As an alternative, the portion capsule 10 is produced by means of injection moulding methods, in particular in the single-component, multiple-component or in-mould method. As a further alternative, it would be conceivable that the base element 12 is produced completely or partially from a bio-degradable material, in particular from cellulose fibres which can be embedded into a resin matrix.

FIG. 1B illustrates a diagrammatic view "from above" of the portion capsule 10 in accordance with the exemplary embodiment of the present invention. The top view takes place along the arrow 60 which is shown in FIG. 1A. To this extent, the view is of the upper side 28 of the lid film 33, and the code which is applied to the lid film 33 and represents the visually detectable feature 34 can be seen here.

In order to illustrate the bit code or barcode, a part region 70 of the code is shown enlarged and by way of example. It can be seen that this is by way of example a bit code or barcode with quasi-parallel bars in the radial direction.

Figure 1C:
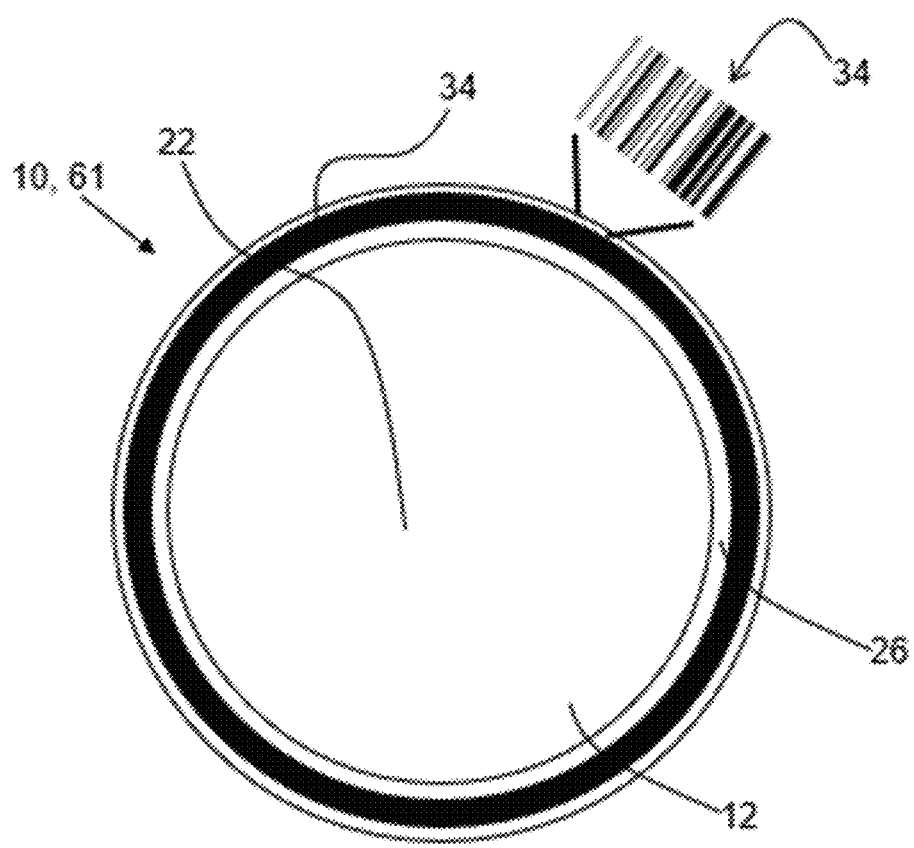
FIG. 1C shows a diagrammatic view "from below" of the portion capsule in accordance with the exemplary embodiment of the present invention.

FIG. 1C shows a diagrammatic view "from below" of the portion capsule in accordance with the exemplary embodiment of the present invention. The view from below takes place along the arrow 61 which is shown in FIG. 1A. In this perspective, in particular, the capsule body 12 and the flange 26 can be seen. On account of the fact that at least the flange 26 is of transparent configuration, the view here is of a lower side 30 of the lid film 33, which lower side 30 lies opposite the upper side 28. By virtue of the fact, however, that at least the edge region 38 of the lid film 33 is also of visually transparent configuration, the code can also be recognized, through the lid film 33, "from below" through the flange 26 and the lid film 33 in this perspective, with the result that the detector can also read out the code from this perspective (see arrow 50 in FIG. 1A).

LIST OF REFERENCE NUMERALS

A part of the base element
B part of the base element
10 Portion capsule
12 Base element
14 Side wall of the base element
20 Cavity for beverage raw material
22 Bottom region of the base element
26 Flange of the base element
28 Upper side of the lid film
30 Lower side of the lid film
33 Capsule lid/lid film
34 Visually detectable feature
38 Edge region of the lid film
49 Ring
50 Detection direction of a detector
51 Detector
52 Beverage preparation machine
60 View "from above"
61 View "from below"
70 Part region of the code

The invention claimed is:

1. A portion capsule for preparing a beverage with a beverage production machine, the portion capsule having a base element with a cavity for receiving a beverage raw material and a capsule lid which closes the cavity, the base element comprising a capsule bottom, a circumferential flange, and a capsule wall, which extends from the capsule bottom to the circumferential flange, the capsule lid being fastened to the flange, wherein the portion capsule comprises a visually detectable feature which can be visually detected by a detector of the beverage production machine, the visually detectable feature being arranged on a side of the capsule lid, which side faces away from the flange, wherein the flange and the capsule lid are of a visually transparent configuration at least in a region of the visually detectable feature.

2. The portion capsule according to claim 1, wherein only an edge region of the capsule lid or an entire capsule lid is of the visually transparent configuration.

3. The portion capsule according to claim 1, wherein an adhesive layer is arranged between an edge region of the capsule lid and the flange to connect the capsule lid and the flange, the adhesive layer being of a visually transparent configuration.

4. The portion capsule according to claim 1, wherein the visually detectable feature is arranged in an edge region of the capsule lid in relation to a main plane of extent of the capsule lid.

5. The portion capsule according to claim 1, wherein the portion capsule has a ring, the visually detectable feature is arranged or printed on the ring, the ring is arranged on the side of the capsule lid, which side faces away from the flange, the ring is adhesively bonded onto the capsule lid, the ring is of a visually transparent configuration.

6. The portion capsule according to claim 1, wherein the base element is of a completely visually transparent configuration.

7. The portion capsule according to claim 1, wherein the base element is constructed in two parts from a base part and a flange part, and only the flange part is of the visually transparent configuration, the base part and the flange part are connected to one another.

8. The portion capsule according to claim 1, wherein the visually detectable feature is a machine-readable code, or a one-dimensional or multiple-dimensional bit code or barcode.

9. A method of using the portion capsule according to claim 1 for preparing the beverage with the aid of the beverage production machine, wherein the method comprises detecting the visually detectable feature of the portion capsule with the detector of the beverage production machine.

10. An apparatus comprising the beverage production machine and the portion capsule according to claim 1.

11. The apparatus according to claim 10, wherein the beverage production machine comprises a pump that is put into operation only upon a detection of the visually detectable feature and a determination by a controller or processor of the detector or the beverage production machine that the portion capsule is suitable for the beverage production machine.

12. The apparatus according to claim 11, wherein the detector is located above the capsule lid after the portion capsule is inserted into the beverage production machine.

13. The apparatus according to claim 11, wherein the detector is located below the capsule lid after the portion capsule is inserted into the beverage production machine.

14. The apparatus according to claim 13, wherein the beverage production machine comprises a seal that is configured to contact and/or seal against a sealing region of the capsule lid.

15. The apparatus according to claim 14, wherein the beverage production machine comprises a spike that is configured to perforate or pierce the capsule lid.

16. The apparatus according to claim 15, wherein the beverage production machine comprises a controller that is configured to receive signals from the detector and send signals to the pump.

17. The apparatus according to claim 16, wherein the controller comprises a memory and one or more brewing parameters are stored in the controller.

18. An apparatus comprising:
a portion capsule; and
a beverage machine comprising a pump and a detector;
wherein the portion capsule has a base element with a cavity for receiving a beverage raw material, the base element has a top end and an opposing bottom end, the base element comprises a flange that is located closer to the top end of the base element than the bottom end, the flange includes a top side and an opposing bottom side, a lid having a top side and an opposing bottom side, the bottom side of the lid is attached to the top side of the flange to hermetically close the cavity, and the top side of the lid comprises a code; and
wherein the flange and the lid are each made of a visually transparent material, and the detector of the beverage machine is located below the flange and is configured to direct a beam through the visually transparent material of the flange and through the visually transparent material of the lid to read the code, and the pump and/or brewing parameters of the beverage machine are controlled based on the read code.

19. The apparatus according to claim 18, wherein the lid is attached to the flange with an adhesive and the beam is directed through the adhesive to read the code.

20. An apparatus comprising:
a portion capsule; and
a beverage machine comprising a pump and a detector;
wherein the portion capsule has a base element with a cavity for receiving a beverage raw material, the base element has a top end and an opposing bottom end, the base element comprises a flange that is located closer to the top end of the base element than the bottom end, the flange includes a top side and an opposing bottom side, a lid having a top side and an opposing bottom side, the bottom side of the lid is attached to the top side of the flange to hermetically close the cavity, and the lid comprises a code; and
wherein the detector of the beverage machine is located below the flange and is configured to direct a beam through the flange to read the code on the lid, and the pump and/or brewing parameters of the beverage machine are controlled based on the read code.

21. The apparatus according to claim 20, wherein the code is printed on a ring and the ring is attached to the top side of the lid.

\* \* \* \* \*